US012696047B2

(12) United States Patent
Betori et al.

(10) Patent No.: US 12,696,047 B2
(45) **Date of Patent: \*Jul. 28, 2026**

(54) DYNAMIC GEOFENCING FOR TEMPORARY WORK TIME VALIDATION

(71) Applicant: TrueBlue, Inc., Tacoma, WA (US)

(72) Inventors: Richard Paul Betori, Gurnee, IL (US); Eric Eugene Lawson, Allen, TX (US); Christopher A. Kapcar, Hinsdale, IL (US); Robert Michael Ward, Issaquah, WA (US); Jeffrey S. Dirks, Kirkland, WA (US); Jeroen Anton Decker, Ravensdale, WA (US)

(73) Assignee: TrueBlue, Inc., Tacoma, WA (US)

( * ) Notice: Subject to any disclaimer, the term of this patent is extended or adjusted under 35 U.S.C. 154(b) by 12 days.

This patent is subject to a terminal disclaimer.

(21) Appl. No.: 18/933,942

(22) Filed: Oct. 31, 2024

(65) Prior Publication Data

US 2025/0150780 A1 May 8, 2025

Related U.S. Application Data

(63) Continuation of application No. 17/191,010, filed on Mar. 3, 2021, now Pat. No. 12,185,178.

(Continued)

(51) Int. Cl.
*H04W 4/021* (2018.01)
*G06Q 10/0631* (2023.01)
(Continued)

(52) U.S. Cl.
CPC .... *H04W 4/021* (2013.01); *G06Q 10/063118* (2013.01); *G06Q 10/1053* (2013.01);
(Continued)

(58) Field of Classification Search
None
See application file for complete search history.

(56) References Cited

U.S. PATENT DOCUMENTS 9,020,848 B1 * 4/2015 Ridge ..................... G07C 1/10
705/7.15
9,305,196 B2 * 4/2016 Schoner ............... H04W 4/029
(Continued)

FOREIGN PATENT DOCUMENTS

WO 2015051421 A1 4/2015

OTHER PUBLICATIONS

Rodriguez Garzon, Sandro, and Bersant Deva. "Geofencing 2.0: taking location-based notifications to the next level." Proceedings of the 2014 ACM International Joint Conference on Pervasive and Ubiquitous Computing. 2014. (Year: 2014).*

(Continued)

*Primary Examiner* — Gurkanwaljit Singh
(74) *Attorney, Agent, or Firm* — Perkins Coie LLP; Colin Fowler

(57) ABSTRACT

Disclosed is a platform that provides temporary staff along with administrative infrastructure to employers who have temporary staffing needs. Administrative issues are monitored via dynamically generated geofences and mobile devices (mobile phones) carried by worker-users. The geofences serve as time clock and behavioral monitor zone.

20 Claims, 9 Drawing Sheets

Related U.S. Application Data

(60) Provisional application No. 63/016,158, filed on Apr. 27, 2020.

(51) Int. Cl.

| | |
|---|---|
| *G06Q 10/1053* | (2023.01) |
| *G06Q 10/1091* | (2023.01) |
| *G06Q 20/08* | (2012.01) |
| *G06Q 40/12* | (2023.01) |
| *H04W 4/029* | (2018.01) |
| *G06Q 10/0639* | (2023.01) |
| *G10L 25/48* | (2013.01) |

(52) U.S. Cl.

CPC ....... *G06Q 10/1091* (2013.01); *G06Q 20/085* (2013.01); *G06Q 40/125* (2013.12); *H04W 4/029* (2018.02); *G06Q 10/06398* (2013.01); *G10L 25/48* (2013.01)

(56) References Cited

U.S. PATENT DOCUMENTS

| | | | | |
|---|---|---|---|---|
| 9,867,000 | B2 * | 1/2018 | Zises | H04W 4/21 |
| 9,998,866 | B2 * | 6/2018 | Natucci, Jr. | H04W 4/029 |
| 10,229,375 | B2 * | 3/2019 | Davidson | G06Q 10/063114 |
| 10,586,212 | B2 | 3/2020 | Leslie | |
| 11,416,958 | B1 * | 8/2022 | Reichert | H04W 4/029 |
| 2009/0326991 | A1 * | 12/2009 | Wei | G06Q 10/08355 |
| | | | | 705/5 |
| 2010/0179853 | A1 * | 7/2010 | Garcia | G06Q 10/06 |
| | | | | 705/29 |
| 2013/0324166 | A1 * | 12/2013 | Mian | H04W 4/029 |
| | | | | 455/457 |
| 2014/0035726 | A1 * | 2/2014 | Schoner | H04W 64/00 |
| | | | | 340/8.1 |
| 2014/0057648 | A1 * | 2/2014 | Lyman | H04B 7/0417 |
| | | | | 455/456.1 |
| 2014/0278645 | A1 * | 9/2014 | Davidson | G06Q 10/063114 |
| | | | | 705/7.15 |
| 2015/0161553 | A1 * | 6/2015 | Eggleston | H04W 4/021 |
| | | | | 705/7.15 |
| 2015/0215736 | A1 * | 7/2015 | Josefiak | G01C 21/3867 |
| | | | | 455/456.1 |

| | | | | |
|---|---|---|---|---|
| 2016/0300191 | A1 | 10/2016 | Leslie | |
| 2016/0321614 | A1 | 11/2016 | Leslie | |
| 2017/0180932 | A1 * | 6/2017 | Zises | H04W 4/022 |
| 2018/0247276 | A1 * | 8/2018 | Tamma | G06Q 10/1097 |
| 2018/0308063 | A1 * | 10/2018 | Jan | G07C 9/257 |
| 2018/0350144 | A1 * | 12/2018 | Rathod | G06Q 20/3224 |
| 2019/0050946 | A1 * | 2/2019 | Hicks | H04W 4/021 |
| 2019/0102726 | A1 * | 4/2019 | Ushiki | H04W 4/022 |
| 2019/0385113 | A1 * | 12/2019 | Dumitras | G07C 1/10 |
| 2020/0118056 | A1 | 4/2020 | Leslie | |
| 2020/0311687 | A1 | 10/2020 | Leslie | |
| 2021/0326901 | A1 * | 10/2021 | Daley | G06N 20/00 |

OTHER PUBLICATIONS

Lutze, Rainer, and Klemens Waldhör. "Personal health assistance for elderly people via smartwatch based motion analysis." 2017 IEEE International Conference on Healthcare Informatics (ICHI). IEEE, 2017. (Year: 2017).*

Yung, Jill. "Big Brother Is Watching: How Employee Monitoring in 2004 Brought Orwell's 1984 to Life and What the Law Schould Do About It." Seton Hall Law Review 36.1 (2005): 5. (Year: 2005).*

Lackey, S. (2014). Integrating place and time with tasks: Supporting the student commuter (Order No. 3620700). Available from ProQuest Dissertations and Theses Professional. (1540841346). Retrieved from https://dialog.proquest.com/professional/docview/1540841346?accountid=131444 (Year: 2014).*

Lackey, S. Integrating place and time with tasks: Supporting the student commuter, Available fr X ProQuest Dissertations and Theses Professional. (1540841346). URL: https://dialog.proquest.com/professional/docview/1540841346?accountid=131444, 2014.

Lutze, Rainer et al., "Personal health assistance for elderly people via smartwatch based motion analysis", 2017 IEEE International Conference on Healthcare Informatics (ICHI). IEEE, 2017. (Year: 2017).

Rodriguez Garzon et al., "Geofencing 2.0: taking location-based notifications to the next level", Proceedings of the 2014 ACM International Joint Conference on Pervasive and Ubiquitous Computing. 2014. (Year: 2014).

Yung, Jill, "Big Brother Is Watching: How Employee Monitoring in 2004 Brought Orwell's 1984 to Life and What the Law Should Do About It", Seton Hall Law Review 36.1 (2005): 5. (Year: 2005).

* cited by examiner

410

420

DYNAMIC GEOFENCING FOR TEMPORARY WORK TIME VALIDATION

CROSS-REFERENCE TO RELATED APPLICATIONS

This application is a continuation of U.S. application Ser. No. 17/191,010 filed Mar. 3, 2021, which claims priority to U.S. Provisional Application No. 63/016,158, titled "Dynamic Geo-Fencing for Temporary Work Time Validation" and filed on Apr. 27, 2020, which is incorporated by reference herein in its entirety.

TECHNICAL FIELD

Various embodiments of the present technology generally relate to data delivery and geofencing. More particularly, the disclosure relates to monitoring of mobile devices as relative to a geofence.

BACKGROUND

Traditionally, temporary employment staffing systems have included branch offices where potential workers arrive early in the morning and are directed to various available temporary staffing positions for the day (e.g., event and convention workers, construction, skilled laborers, one-time projects, etc.) based on their experience. The above staffing model has evolved into a digital model that makes use of mobile applications to guide potential workers to available positions.

Additionally, when an employer manages a set of employees, there are administrative burdens placed on the employer (e.g., time recordation). Those administrative burdens still exist in the environment of temporary employment, though the employer may not be configured to manage the administrative burden for the temporary employees.

DETAILED DESCRIPTION

Short-term, temporary employment staffing platforms operate by linking a number of available workers to gigs (e.g., short-term, temporary employment). Available jobs are matched to workers and recommended thereto. The matching process is largely based on qualifications of the worker based on their previous work, certifications, review on previous gigs, and availability.

An example of a gig staffing platform makes use of a mobile device application where workers can browse their matches and sign up to work. Once the worker has chosen a job or gig and signs up, the worker shows up and works the gig. Because the positions are temporary (e.g., many lasting no more than a single shift), there does not tend to be any sort of extended evaluation or interview process. If a worker is qualified to sign up for the work, they may sign up and show up to the job. If the worker had worked for a given employer before, there may be a pre-existing evaluation on that worker (e.g., blacklisting or whitelisting the worker).

Because the work engagements are temporary, there is often little to no infrastructure in place to monitor the temporary employee. Examples of said monitoring include hours tracking and attentiveness tracking. The worker is paid through a staffing company who is not on site to monitor the worker. The worker may self-report hours, but that is subject to the honesty of the worker. The employer may also report the worker's hours, but that is subject to the honesty of the employer. Both circumstances require notable administrative processing.

However, because the temporary staffing platform operates with client software on each worker's mobile devices—devices that carry location sensors (e.g., via GPS, IP tracing, signal triangulation, etc.)—, the staffing company can verify the location of the worker, and whether the worker is on-site, using the location sensor via the client application. Examples of embodiments of mobile devices include smartphones, individualized location sensors, or signal reflective tokens that are spotted by external transceivers.

The definition for "on-site" will change between each differing temporary work order. In some cases, the site moves (e.g., the worker starts in one location and goes to another). In order to monitor workers, the platform dynamically generates geofences based on specifications of temporary work orders.

In addition to verification of time entry, the platform enables verification of employer reviews regarding whether the worker was late, or left early, or did not go to the proper location.

Exemplary System Embodiment

Figure 1:
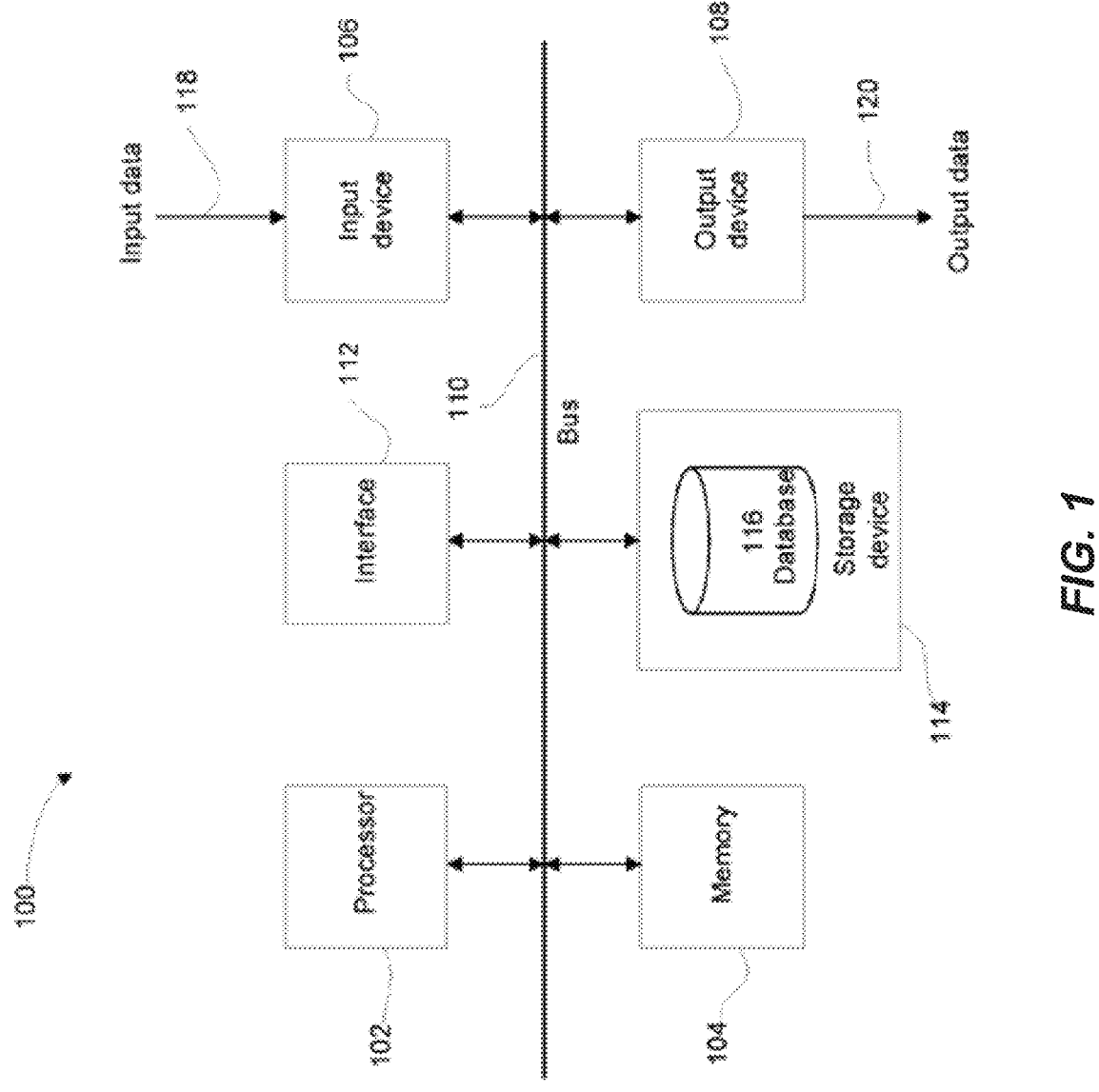
FIG. 1 is an example of how a particular embodiment of the present invention can be realized using a processing device.

FIG. 1 is an example of a particular embodiment of how the present invention can be realized using a processing device. In particular, the processing device 100 generally includes at least one processor 102, or processing unit or plurality of processors, memory 104, at least one input device 106, and at least one output device 108, coupled together via a bus or group of buses 110. In certain embodiments, input device 106 and output device 108 could be the same device. An interface 112 can also be provided for coupling the processing device 100 to one or more peripheral devices, for example, interface 112 could be a PCI card or PC card.

At least one storage device 114 which houses at least one database 116 can also be provided. The memory 104 can be any form of memory device, for example, volatile or non-volatile memory, solid state storage devices, magnetic devices, etc. The processor 102 could include more than one distinct processing device, for example to handle different functions within the processing device 100.

In alternative embodiments, the processing device 100 operates as a standalone device or may be connected (networked) to other machines. In a networked deployment, the machine may operate in the capacity of a server or a client machine in a client-server network environment, or as a peer machine in a peer-to-peer (or distributed) network environment.

Input device 106 receives input data 118 (such as electronic content data), for example via a network or from a local storage device. Output device 108 produces or generates output data 120 (such as viewable content) and can include, for example, a display device or monitor in which case output data 120 is visual, a printer in which case output data 120 is printed, a port for example a USB port, a peripheral component adaptor, a data transmitter or antenna such as a modem or wireless network adaptor, etc. Output data 120 could be distinct and derived from different output devices, for example a visual display on a monitor in conjunction with data transmitted to a network. A user could view data output, or an interpretation of the data output, on, for example, a monitor or using a printer. The storage device 114 can be any form of data or information storage means, for example, volatile or non-volatile memory, solid state storage devices, magnetic devices, etc.

Examples of electronic data storage devices 114 can include disk storage, optical discs, such as CD, DVD. Blu-ray Disc, flash memory/memory card (e.g., solid state semiconductor memory), MultiMedia Card, USB sticks or keys, flash drives, Secure Digital (SD) cards, microSD cards, miniSD cards, SDHC cards, miniSDSC cards, solid-state drives, and the like.

In use, the processing device 100 is adapted to allow data or information to be stored in and/or retrieved from, via wired or wireless communication means, the at least one database 116. The interface 112 may allow wired and/or wireless communication between the processing unit 102 and peripheral components that may serve a specialized purpose. The processor 102 receives instructions as input data 118 via input device 106 and can display processed results or other output to a user by utilizing output device 108. More than one input device 106 and/or output device 108 can be provided. It should be appreciated that the processing device 100 may be any form of terminal. PC, laptop, notebook, tablet, smart phone, specialized hardware, or the like.

The machine may be a server computer, a client computer, a personal computer (PC), a tablet PC, a set-top box (STB), a personal digital assistant (PDA), a cellular telephone or smart phone, a tablet computer, a personal computer, a web appliance, a point-of-sale device, a network router, switch, or bridge, or any machine capable of executing a set of instructions (sequential or otherwise) that specify actions to be taken by that machine.

While the machine-readable (storage) medium is shown in an exemplary embodiment to be a single medium, the term "machine-readable (storage) medium" should be taken to include a single medium or multiple media (a centralized or distributed database, and/or associated caches and servers) that store the one or more sets of instructions. The term "machine-readable medium" or "machine-readable storage medium" shall also be taken to include any medium that is capable of storing, encoding, or carrying a set of instructions for execution by the machine and that cause the machine to perform any one or more of the methodologies of the present invention.

In general, the routines executed to implement the embodiments of the disclosure, may be implemented as part of an operating system or a specific application, component, program, object, module, or sequence of instructions referred to as "computer programs." The computer programs typically comprise one or more instructions set at various times in various memory and storage devices in a computer, and that, when read and executed by one or more processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine or computer-readable media include, but are not limited to, recordable type media such as volatile and non-volatile memory devices, floppy and other removable disks, hard disk drives, optical disks (e.g., Compact Disk Read-Only Memory (CD ROMs), Digital Versatile Discs, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number, respectively. The word "or," in reference to a list of two or more items, covers all of the following interpretations of the word: any of the items in the list, all of the items in the list, and any combination of the items in the list.

Figure 2:
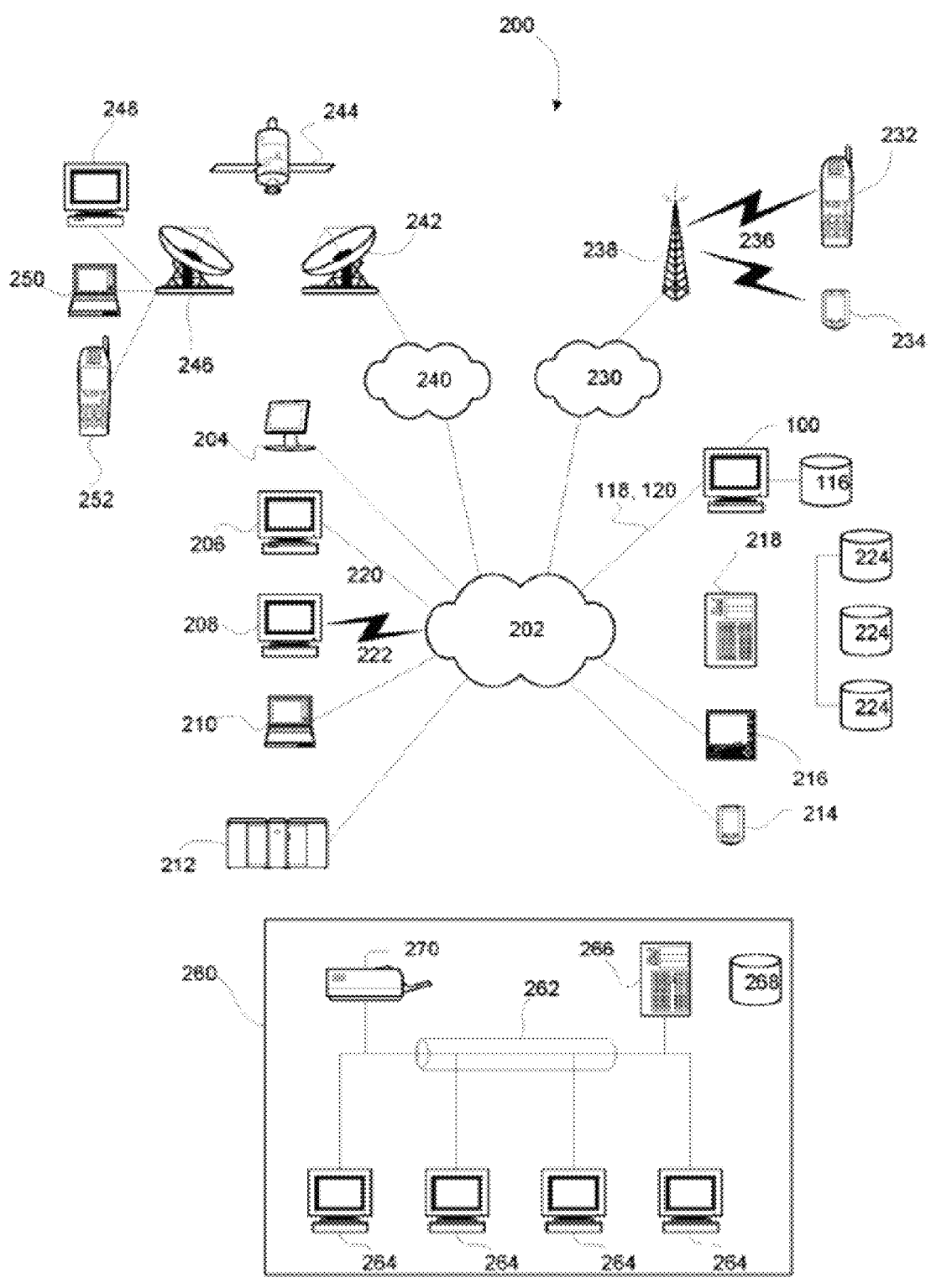
FIG. 2 illustrates a networked communications system that may include the processing device.

FIG. 2 illustrates a networked communications system 200 that may include the processing device 100. Processing device 100 could connect to network 202, for example, the Internet or a WAN. Input data 118 and output data 120 could be communicated to other devices via network 202. Other terminals, for example, thin client 204, further processing systems 206 and 208, notebook computer 210, mainframe computer 212, PDA 214, pen-based computer 216, server 218, etc., can be connected to network 202. A large variety of other types of terminals or configurations could be utilized. The transfer of information and/or data over network 202 can be achieved using wired communications means 220 or wireless communications means 222. Server 218 can facilitate the transfer of data between network 202 and one or more databases 224. Server 218 and one or more databases 224 provide an example of an information source.

Other networks may communicate with network 202. For example, telecommunications network 230 could facilitate the transfer of data between network 202 and mobile or cellular telephone 232 or a PDA-type device 234, by utilizing wireless communication means 236 and receiving/transmitting station 238. Mobile telephone 232 devices may load software (client) that communicates with a backend server 206, 212, 218 that operates a backend version of the software. The software client may also execute on other devices 204, 206, 208, and 210. Client users may come in multiple user classes such as worker-users and/or employer-users.

Satellite communications network 240 could communicate with satellite signal receiver 242 which receives data signals from satellite 244 which in turn is in remote communication with satellite signal transmitter 246. Terminals, for example, further processing system 248, notebook computer 250, or satellite telephone 252, can thereby communicate with network 202. A local network 260, which, for example, may be a private network, LAN, etc., may also be connected to network 202. For example, network 202 may relate to ethernet 262, which connects terminals 264; server 266, which controls the transfer of data to and/or from database 268; and printer 270. Various other types of networks could be utilized.

The processing device 100 is adapted to communicate with other terminals, for example further processing systems 206, 208, by sending and receiving data, 118, 120, to and from the network 202, thereby facilitating possible communication with other components of the networked communications system 200.

Thus, for example, the networks 202, 230, 240 may form part of, or be connected to, the Internet, in which case, the terminals 206, 212, 218, for example, may be web servers, Internet terminals, or the like. The networks 202, 230, 240, 260 may be or form part of other communication networks, such as LAN, WAN, ethernet, token ring, FDDI ring, star, etc., networks, or mobile telephone networks, such as GSM, CDMA, 3G, 4G, etc., networks, and may be wholly or partially wired, including, for example, optical fiber or wireless networks, depending on a particular implementation.

Figure 3:
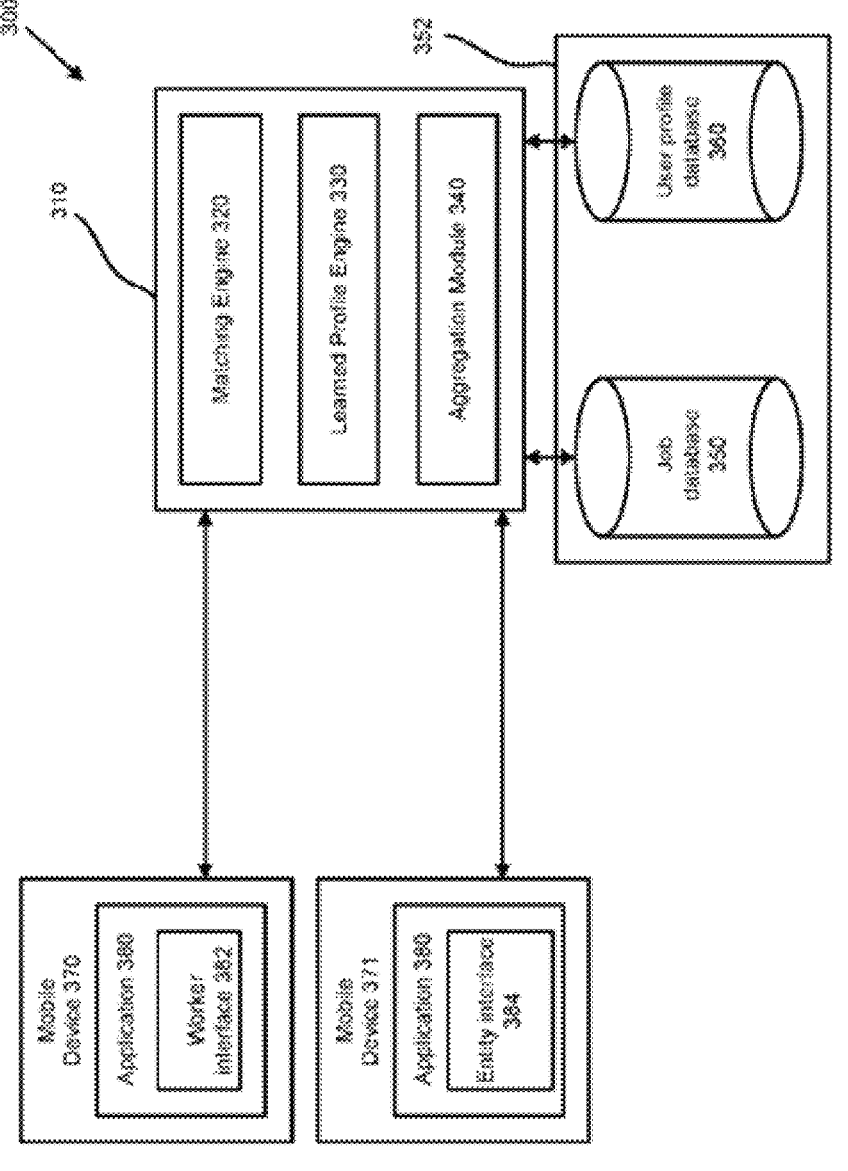
FIG. 3 illustrates a system diagram of a system for matching workers to entities which define jobs.

FIG. 3 illustrates a system diagram of a system 300 for matching workers to entities which define jobs. In particular, the system 300 includes a server processing system 310 in data communication with a first and second mobile device 370, 371, preferably smart phones, or tablet processing systems, etc., via a one or more communication networks. The first mobile device 370 is operated by a worker and the second mobile device 371 is operated by an entity. It will be appreciated that the system 310 can include a plurality of first and second mobile devices 370, 371 operated by a respective plurality of workers and entities. The server processing system 310 may access or include a data store 352 including a user profile database 360 and a job database 350.

It will be appreciated that user profile database 360 and job database 350 can be hosted by the server processing system 310; however, it is equally possible that the user profile database 360 and the job database 350 are hosted by other database serving processing systems. Processing system 100 is suitable for operation as the server processing system 310. The server processing system 310 includes a matching engine 320, a learned profile engine 330, and an aggregation module 340 which will be discussed in more detail in various examples below.

The user profile database 360 includes profiles for both workers (associates) and employers (clients). When an employer-user has a service request (may be referred to as any of "job," "shift," or "gig") the employer-user makes use of the platform to select a job template that most closely matches the service request that they have and provides the requisite time period the service request is associated with. Each job template includes a number of requisites (skills/certifications) for worker-users to match to the job. The employer may add additional criteria to the service request in addition to the template (e.g., drug tests, average worker rating, etc.). Worker-users whom match the service request may sign up for the shift and work that service request.

The matching engine 320 may match workers to job requests on an absolute or percentage basis. Where a percentage basis is implemented, a threshold percentage is considered a match. A near-miss match may be established via an absolute basis or percentage. Where a percentage basis is implemented, near-miss matches similarly use a threshold percentage, but lower than the threshold percentage for matches.

The mobile devices 370, 371 include a processor, a memory, an input and output device preferably provided in the form of a touch screen interface, and a communication device. Preferably, the mobile device 370, 371 includes a location receiver (such as a Global Positioning System location receiver) 375. Preferably, the mobile devices 370, 371 have stored in the memory a mobile device application 380 which can be downloaded by the mobile devices 370, 371 from a software repository processing system. The user can register with the server processing system 310 as a worker or an entity. If the user registers as a worker, a worker interface 382 will be presented via the mobile application 380 via their respective mobile device 370. If the user registers as an entity, an entity interface 384 will be presented via the mobile application 380 via their respective mobile device 371. However, it will be appreciated that two separate mobile applications could be provided for the two different types of users in alternate arrangements.

Figure 4:
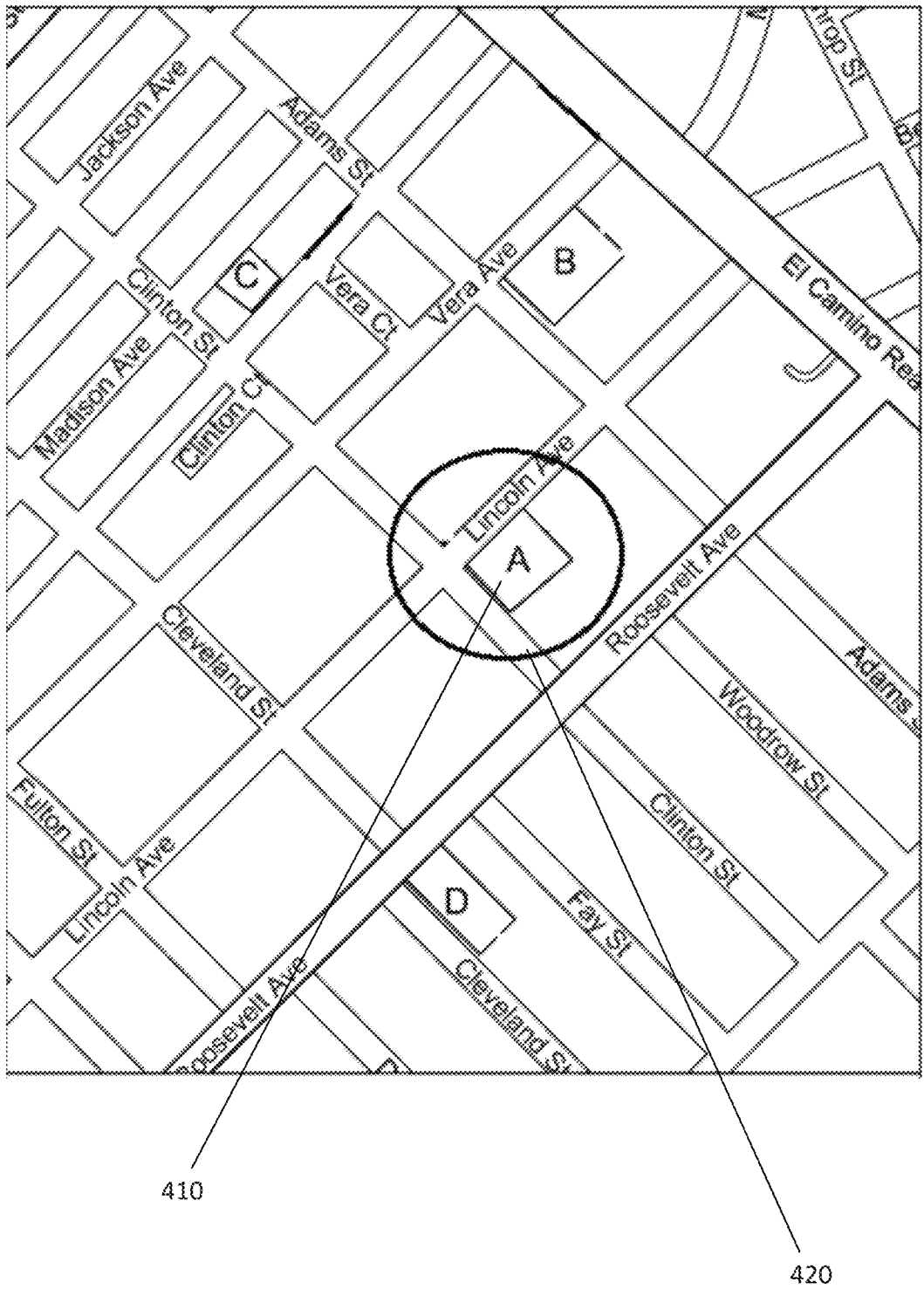
FIG. 4 is an illustration of a dynamically generated geofence.

FIG. 4 is an illustration of a dynamically generated geofence. Depicted in the figure, a shift or gig was accepted at location A 410. Location A 410 is defined by the employer-user when the employer-user engages with the system and requests a worker to fill the shift. In some embodiments, the employer indicates an address and a time period for the shift, and the temporary employment platform dynamically generates a geofence 420 around the address. In some embodiments, the geofence is generated in response to the creation of the shift and/or in response to a first worker user signing on to fill the shift. The geofence 420 is temporary and exists only for the time period associated with the shift or the time period associated with the shift and some additional tolerance time (tolerance time may be computed as some static value+/− the stated time period of the shift or a value of time based on a percentage of the total length of the shift).

The size of the geofence 420 may be sized based on dimensions the property for the given address (e.g., as identified via mapping software or during an onboarding process for the employer) or based on the type of work involved in the shift (e.g., whether the work requires a lot of mobile or stationary work as identified by the associated job template). The shape of the geofence 420 may be configured as a circle that includes both the address and some surrounding area or is restricted to the physical footprint of relevant buildings or lots/roads. The geofence 420 additionally includes a time window based on parameters of the associated shift.

When a worker-user signs up for a given shift, the platform is enabled to track the location of the worker's mobile device (e.g., via GPS associated with the mobile device, cellular triangulation, or IP tracing). In some embodiments, the location tracing does not begin until the current time is within a threshold period relative (before/after/during) the associated shift. When a worker crosses into the geofence 420 (or is present in the geofence at creation thereof), a time clock is started to record the worker's hours. In some embodiments, the time-clock activation is not automatic; rather, the user is enabled to toggle their time-clock only while they are within the geofence 420.

In these embodiments, the mobile application of the worker-user has additional features while the worker-user is within the geofence 420.

In some embodiments, prior to the shift, the platform compares a present location of the worker to the location of the geofence. Based on the distance between the current location and the geofence, the platform delivers a reminder notification to the worker's device indicating to the worker when they should leave in order to arrive at the geofenced location on time. Travel speed for the worker is estimated based on indications in the worker's profile regarding transportation capability and include estimates based on automobile transit time, pedestrian transit time, bicycle transit time, and public transit travel time.

When the worker leaves the geofence 420, their time clock is stopped. The worker is paid based on the time clock established by their device within the dynamically generated geofence. When the worker takes on other shifts for other employers, different geofences are dynamically generated for those shifts and the time clock for those shifts is operated independently based on each respective dynamically created geofence. If the worker remains in the geofence 420 while the geofence ceases to be present, the time clock is stopped when the geofence 420 ceases to be present.

Figure 5A:
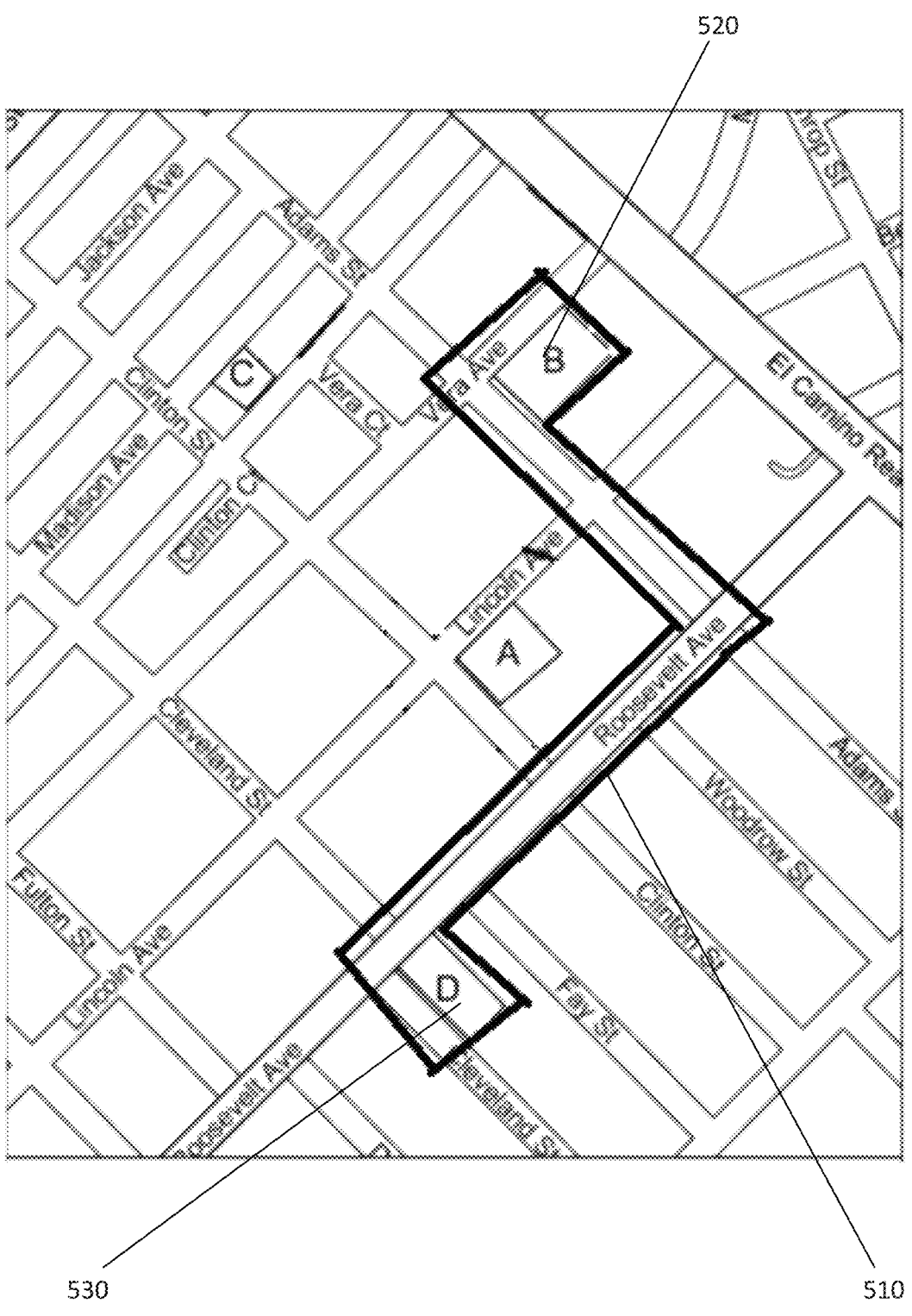
FIGS. 5A and 5B is an illustration of a dynamically generated geofence having an observed driven route.
Figure 5B:
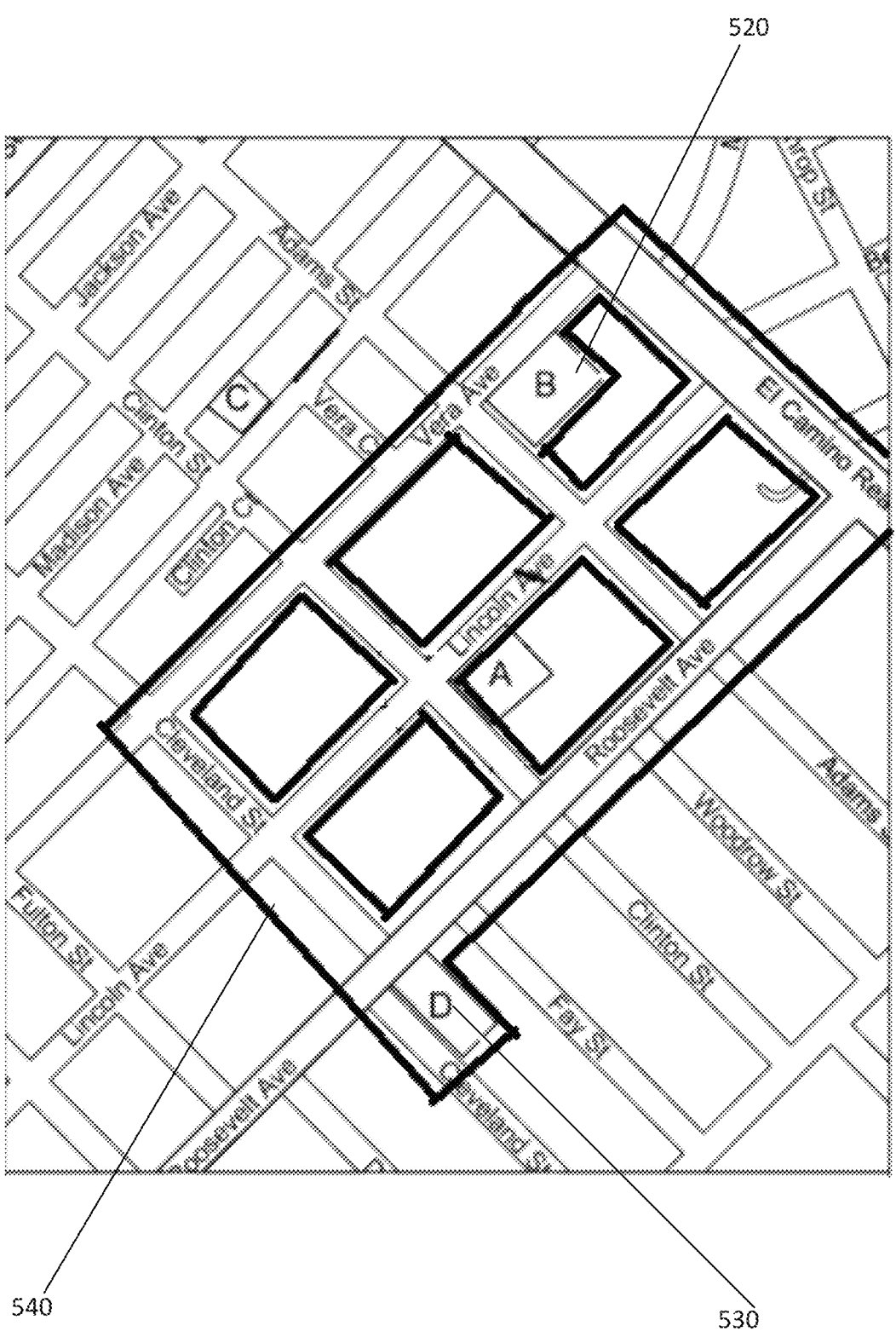

FIGS. 5A and 5B are illustrations of a dynamically generated geofence having an observed driven route. In some embodiments, the geofence 510 is shaped based on a driven route that the worker is to take. For example, in a delivery gig that sends a worker from location B 520 to location D 530, the user is expected to drive along a route that includes an irregularly shaped geofence 510. In some embodiments, the geofence 540 includes multiple routes between location B 520 and location D 530. The worker is accurately tracked across any reasonable route between the two intended locations. A reasonable route is one that does not expressly add unnecessary travel. Geofence 540 includes every combination that doesn't expressly add unnecessary distance, as well as a route that makes use of larger (faster) roads available (e.g., the road labeled "El Camino Real" is larger and tends to accommodate more traffic than other roads included within geofence 540). If the worker deviates and exits the geofence 510, 540 the platform is notified. Another example of traveling shifts include groundskeepers or landscapers moving between properties.

In some embodiments, the geofences in various embodiments herein are directional. Specifically, the worker is intended to travel from one side of the geofence to the other without doubling back. In some embodiments, directionality of a geofence is not static and may change based on the task that is intended to be carried out within the geofence. The platform tracks efficiency of workers via directionality of a geofence. Based on the movements of a given worker within the geofences disclosed herein, the platform can identify the percentage of time the worker spends moving in the expected direction as compared to moving in unexpected directions.

In some embodiments, the geofence is arranged based on an initial "trailblazing" session prior to the shift. In some circumstances, a given geofence may be used more than once where a given shift is recurring (e.g., daily, weekly, etc.). Trailblazing is where a given user maps the path that is to be covered by the geofence prior to need of the geofence such that that personally mapped geofence may used at a later time. The trailblazing may be performed by an administrator user, or by an initial worker in a recurring shift.

Figures 6A, 6B:
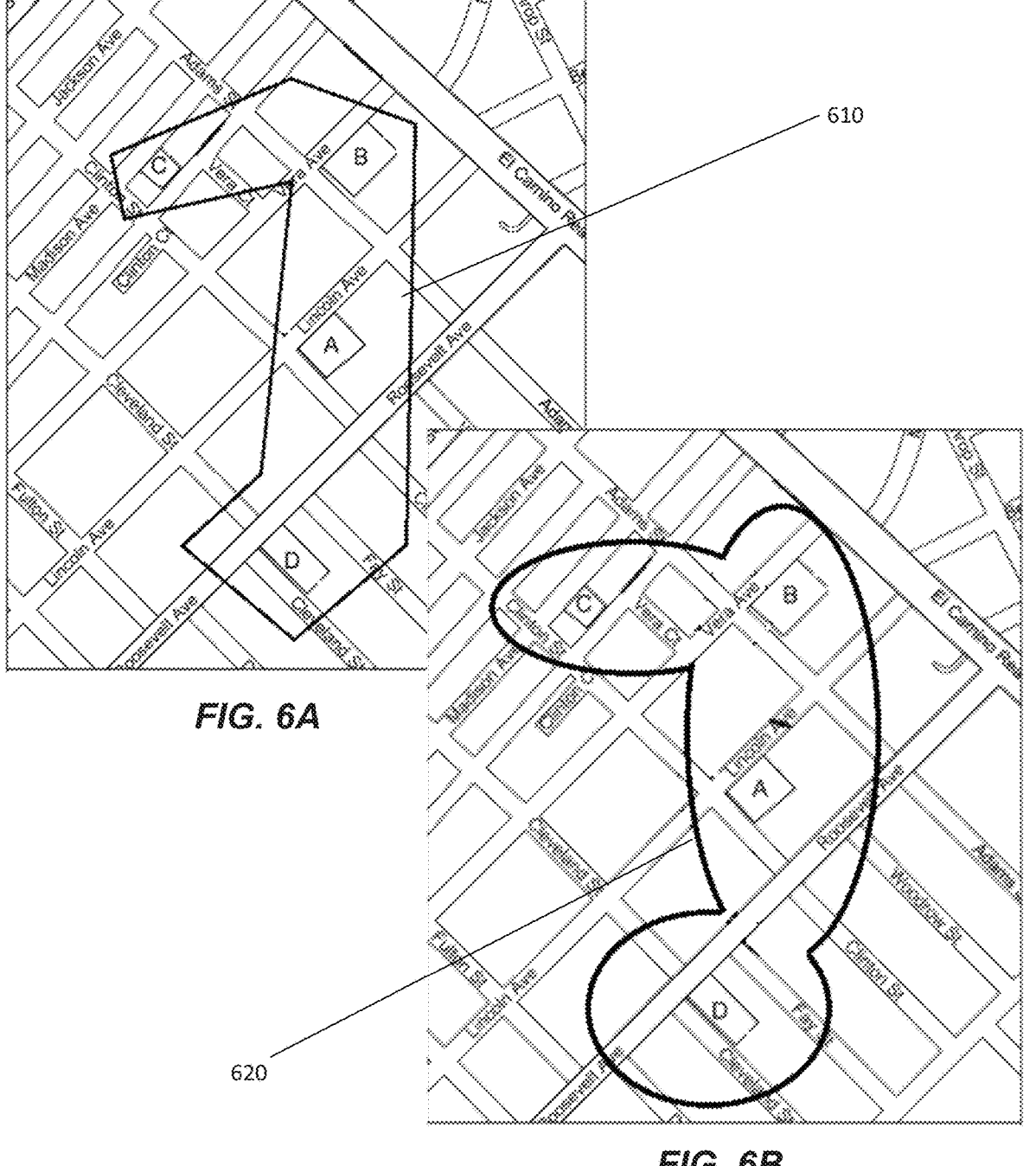
FIGS. 6A and 6B is an illustration of a dynamically generated geofence having multiple stops.

FIGS. 6A and 6B are illustrations of dynamically generated geofences having multiple stops. Similarly, to those geofences described in FIGS. 5A and 5B, the geofence 610 accommodates multiple locations. However, the geofence 610 of FIG. 6 is generated in a manner that draws a polygon around all intended stops during the shift. In some embodiments, the worker is walking between destinations such as on a larger campus including multiple buildings or multiple city blocks. Geofence 620 is generated by growing a bubble around each of the locations until the bubbles intersect by a threshold amount (e.g., a single point of intersection would not include a pathway between the respective locations).

Any of the techniques for generating the shape and structure of dynamically created geofences described in FIGS. 4 through 6B may be used in combination and are not exclusive of one another.

Figure 7:
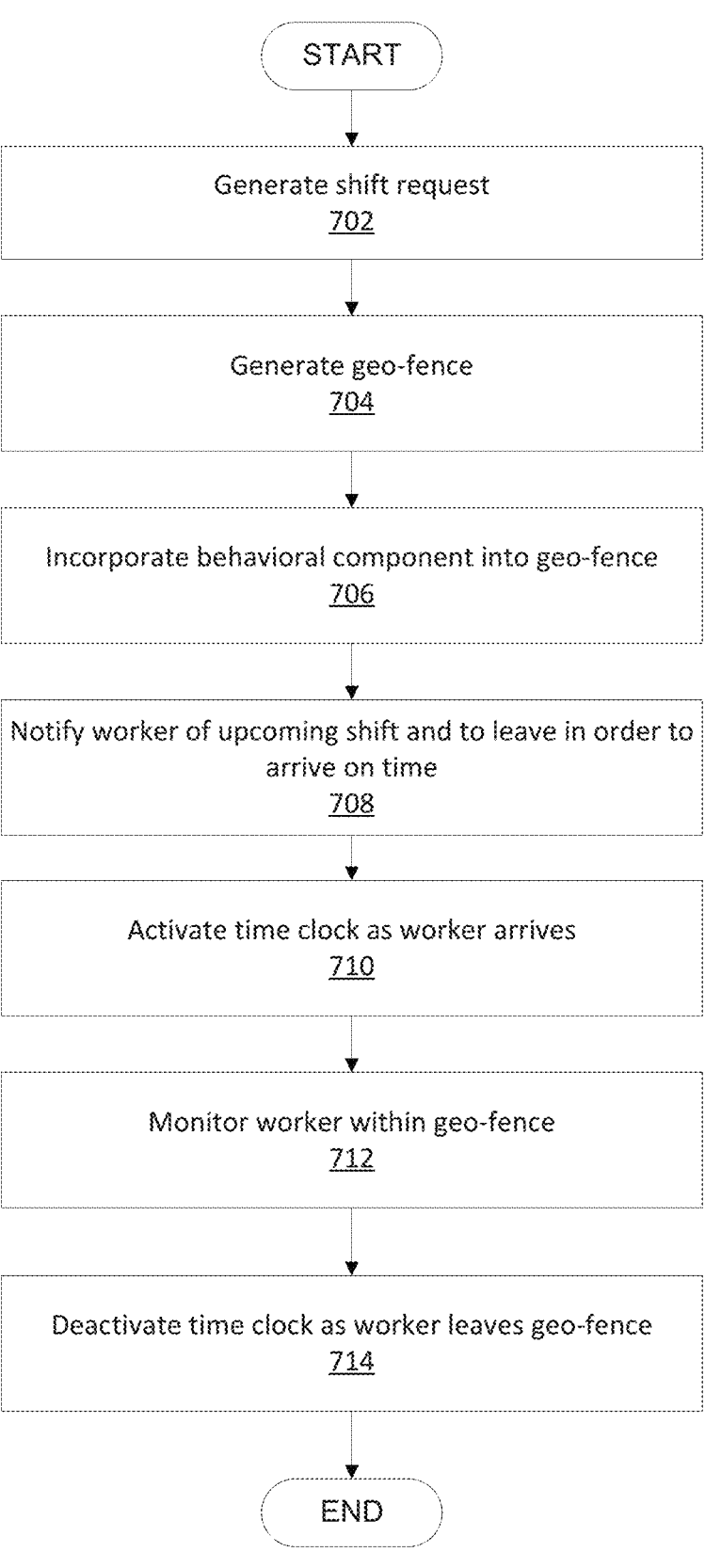
FIG. 7 is a flow chart illustrating dynamic generation of geofences.

FIG. 7 is a flow chart illustrating dynamic generation of geofences. In step 702, an employer-user generates a shift request. The shift request includes the type of work requested (based at least in part on an initial job template chosen). The shift request further includes the location the work is to be performed in and the time frame. The location the work is to be performed in may be determined a number of ways. For example, an input address of list of addresses may be used. Additionally, the location may be defined by computer vision analysis of a submitted map.

In step 704, the platform generates a geofence for the shift request. The initial generation of the geofence includes a time component, a shape component, and size component. The time component refers to the period the shift is to be worked (e.g., 9 am to 5 pm on a given date). In some embodiments, the geofence does not become active until a threshold time before the time component is reached.

The shape component refers to how the geofence is formed around the location that is indicated in the shift request. The shape component is determined by any combination of: the responsibilities indicated by the job template, geography surrounding the location(s) indicated in the shift request, the amount of detail provided in the shift request regarding the location, or travel times as indicated by mapping software. Example shapes include polygons drawn around the relevant location(s), circles or bubbles drawn about an address, or road-shaped fences.

The size component refers to how large the geofence is that surrounds a given location. The size component is based on distances between each location (where there is more than one indicated) or the amount of travel indicated by the job template.

In step 706, the platform incorporates any behavioral components associated with the shift request/job template into the geofence. The behavioral components refer to expected movement within the geofence (e.g., whether the worker is expected to transit between two locations within the geofence or repeatedly move back and forth between a number of locations). The behavioral component may also include activating features of the user's mobile device while they are within the geofence. Activated features may include tracking how often the worker engages with their mobile device, and what apps they are engaging with (e.g., via bitrate in that application or by screen time on that application). Additional activated features include activation of the mobile device microphone to capture audio of how the worker conducts themselves.

The behavioral component may be activated or deactivated based on shift request requirements or based on past action of the worker. For example, if the worker has had a history of behavioral issues performing shift work, or has received a number of poor reviews, the behavioral component may be activated in order to monitor that worker and validate or vacate the poor reviews.

In some implementations, an administrative user may activate a playback feature that indicates where a given worker has been. The playback feature is a historical view of a day/week/month/year/custom timeframe such as with video/series of map frames illustrating worker device, where the actions of a worker or workers is shown within and between geofenced areas. The playback feature acts as "proof" that workers showed up, and work was performed. This interface would provide useful account management reports to share with the originator of the shift and is helpful in avoiding timecard disputes.

In step 708, prior to the shift beginning, registered worker-users may be notified that they should begin heading toward the geofence. The notifications are delivered to the mobile device via push notifications, SMS, and/or email. The travel notifications are based on any combination of: the worker's current position as compared to the location of the geofence, current traffic status, an indicated method of travel in the worker's user profile (pedestrian/bike/public transit/automobile).

In step 710, the worker arrives at the geofence and a time clock starts. As the worker enters the geofence, any behavioral component associated with either the worker or the geofence itself is engaged for that worker. In step 712, the worker is monitored inside the geofence. In step 714, the worker leaves the geofence and the time clock stops.

In some embodiments, the platform sends alert notifications to warn the worker or the shift originator that a worker is actively leaving the geofence. The act of leaving is identified by determining that a vector describing the movement of the worker's device is nearing the geofence boundary and will cross within a predefined threshold of time based on the vector. In such circumstances, a worker is enabled to respond to the notification by indicating via a client application that the shift originator has directed them to leave the geofence—or other explanations (break; safety; traffic, etc). The platform administrator is enabled to respond to deviation from geofence or route so that they can proactively message communicate to either the worker or shift originator of an issue.

Figure 8:
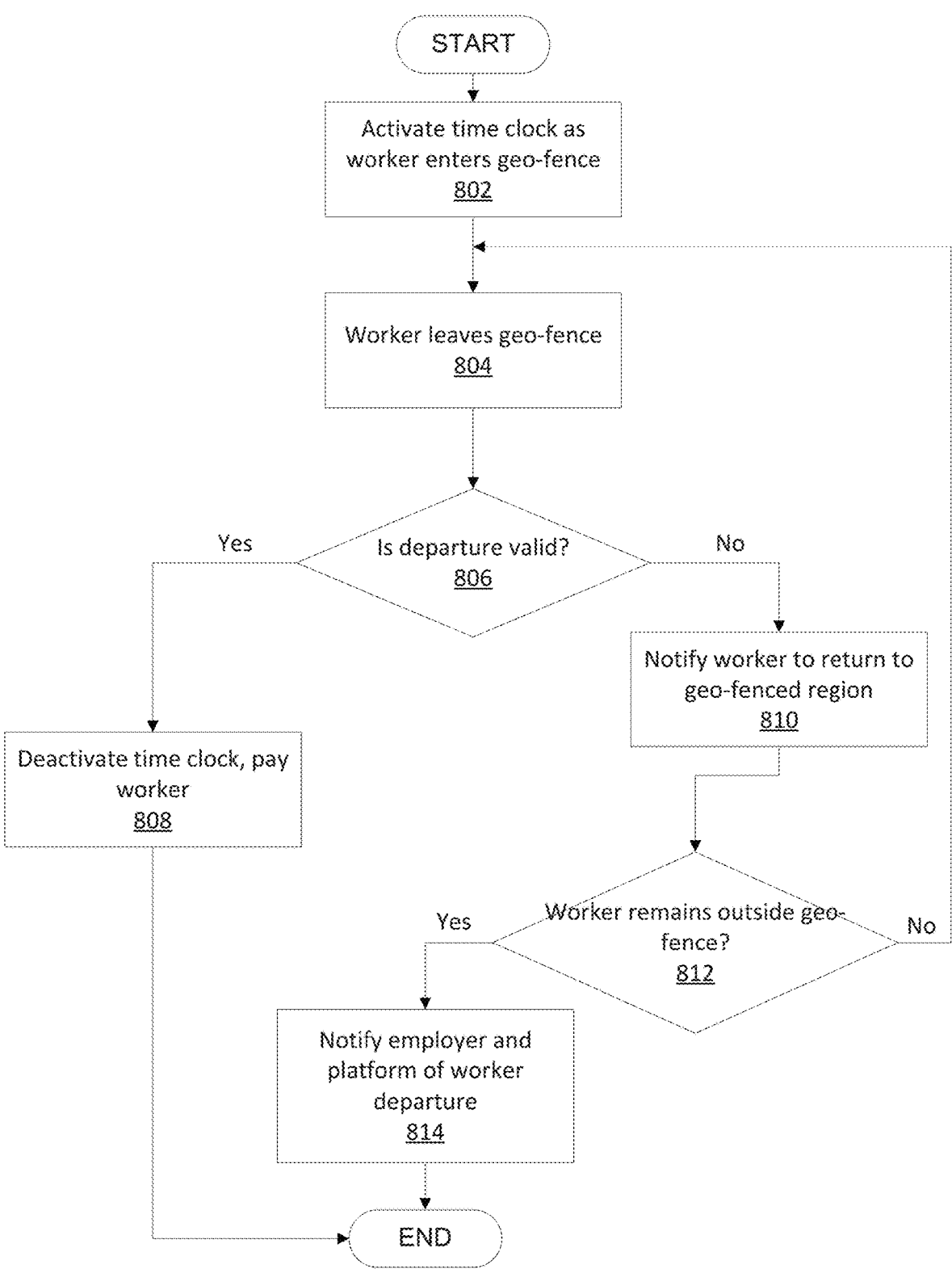
FIG. 8 is a flowchart illustrating verification of time worked via geofences.

FIG. 8 is a flowchart illustrating verification of time worked via geofences. In step 802 a worker enters a geofence as tracked by the locational data (e.g., via GPS, IP trace, cellular triangulation) of the mobile device. The worker is expected to remain within the geofence for the duration of the shift. In step 802, the worker leaves the geofence. At step 806, a determination is made whether the worker should have left. This determination is based on whether the shift is marked as over, or within a threshold of completing. In step 808, where the shift is over, the time clock is shut off and the worker is paid. In step 810, where the shift is not yet over, the worker is notified that they have left the geofence.

In some embodiments, the worker is notified first and given an opportunity to return to the geofence before the employer is notified. In step 812, the platform determines whether the worker remains outside of the geofence for a threshold period. If the worker returns to the geofence, tracking continues. In step 814, where the worker continues to remain outside of the geofence, the employer is notified of the worker's behavior.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps (or employ systems having blocks) in a different order, and some processes or blocks may be deleted, moved, added, subdivided, combined, and/or modified to provide sub- or alternative combinations. Each of these processes or blocks may be implemented in a variety of different ways. Also, while processes or blocks are at times shown as being performed in series, these processes or blocks may instead be performed in parallel or may be performed at different times. Further, any specific numbers noted herein are only examples; alternative implementations may employ differing values or ranges.

The teachings of the disclosure provided herein can be applied to other systems, not necessarily the system described above. The elements and acts of the various embodiments described above can be combined to provide further embodiments.

All patents, applications, and references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for.") Accordingly, the applicant reserves the right to add additional claims after filing the application to pursue such additional claim forms for other aspects of the disclosure.

11

The invention claimed is:

1. A method of implementing a dynamic geofence-based timeclock comprising:

executing an application having at least two groups of users, a first user class and a second user class, wherein user input from a first user of the first class causes the application to generate a first event, the first event having a physical location at a first location and occurring at a first timeframe, and wherein user input from a second user of the second class causes the application to sign the second user up for the first event;

dynamically generating a temporary geofence based on the first timeframe and positioned at coordinates around the first location, wherein the positioning is mapped and identified by a mapping application generating geofences on a per-location basis around a non-predetermined location based on the first timeframe;

temporarily tracking a location of a mobile device of the second user within the temporary geofence during the first timeframe via a location sensor of the mobile device; and in response to the mobile device of the second user producing trackable activity within the temporary geofence as detected by the location sensor of the mobile device, initiating a timer that indicates length of association of the second user with the first event.

2. The method of claim 1, further comprising:

detecting that the location of the mobile device has left the temporary geofence during the existence of the temporary geofence; and in response to said detecting, pausing the timer until the mobile device reenters the temporary geofence.

3. The method of claim 1, wherein the first event further includes a second location, and the temporary geofence is further positioned around the second location and a route between the first location and second location, wherein the route is identified via the mapping application.

4. The method of claim 3, wherein the temporary geofence further includes a directionality based on an expected route between the first location and the second location, the method further comprising:

detecting that the location of the mobile device over time is not proceeding according to the directionality of the expected route; and in response to said detecting, pausing the timer until the location over time of the mobile device follows the directionality of the expected route.

5. The method of claim 1, further comprising:

transmitting, by the application, a notification to the mobile device indicating an estimated arrival time to the first location based on departure at a stated time, wherein departure is based on either of:

a current location of the mobile device; or a registered address of the second user.

6. The method of claim 5, wherein said transmitting is performed at a time prior to the first timeframe, the method further comprising:

determining the time prior to the first timeframe based on an alignment of the arrival time and the first timeframe.

7. The method of claim 1, further comprising:

ending the timer based on an end of the first timeframe; and transmitting a payment to the second user based on an amount of time recorded by the timer.

8. The method of claim 1, further comprising:

temporarily activating, by the application, a microphone of the mobile device during the first timeframe; and

transmitting, by the mobile device to an application server of the application, audio captured by the microphone.

9. The method of claim 1, further comprising:

temporarily monitoring, by the application, other applications executed by the mobile device during the first timeframe; and transmitting, by the mobile device to an application server of the application, a report indicating other applications executed by the mobile device during the first timeframe.

10. A system of implementing a dynamic geofence-based timeclock comprising:

a processor; and a non-transitory computer-readable medium having stored thereon instructions that, when executed by the processor, execute a server-side application that is instanced on user client devices, the application having at least two groups of users, a first user class and a second user class, wherein user input from a first user of the first class causes the application to generate a first event, the first event having a physical location at a first location and occurring at a first timeframe, and wherein user input from a second user of the second class causes the application to sign the second user up for the first event, wherein the non-transitory computer-readable medium further includes instructions that cause the processor to perform operations including:

dynamically generating a temporary geofence based on the first timeframe and positioned at coordinates around the first location, wherein the positioning is mapped and identified by a mapping application generating geofences on a per-location basis around a non-predetermined location based on the first timeframe;

temporarily tracking a location of a mobile device of the second user within the temporary geofence during the first timeframe via a location sensor of the mobile device; and in response to the mobile device of the second user producing trackable activity within the temporary geofence as detected by the location sensor of the mobile device, initiating a timer that indicates length of association of the second user with the first event.

11. The system of claim 10, wherein the performed operations further include:

detecting that the location of the mobile device has left the temporary geofence during the existence of the temporary geofence; and in response to said detecting, pausing the timer until the mobile device reenters the temporary geofence.

12. The system of claim 10, wherein the first event further includes a second location, and the temporary geofence is further positioned around the second location and a route between the first location and second location, wherein the route is identified via the mapping application.

13. The system of claim 12, wherein the temporary geofence further includes a directionality based on an expected route between the first location and the second location, wherein the performed operations further include:

detecting that the location of the mobile device over time is not proceeding according to the directionality of the expected route; and in response to said detecting, pausing the timer until the location over time of the mobile device follows the directionality of the expected route.

14. The system of claim 10, wherein the performed operations further include:

transmitting, by the application, a notification to the mobile device indicating an estimated arrival time to the first location based on departure at a stated time, wherein departure is based on either of:

a current location of the mobile device; or a registered address of the second user.

15. The system of claim 10, wherein the performed operations further include:

temporarily activating, by the application, a microphone of the mobile device during the first timeframe; and transmitting, by the mobile device to an application server of the application, audio captured by the microphone.

16. The system of claim 10, wherein the performed operations further include:

temporarily monitoring, by the application, other applications executed by the mobile device during the first timeframe; and transmitting, by the mobile device to an application server of the application, a report indicating other applications executed by the mobile device during the first timeframe.

17. A method of implementing a dynamic geofence-based timeclock comprising:

executing a temporary staffing application that connects worker users to a plurality of tasks created by employer users, wherein worker users are enabled via the temporary staffing application to sign up for tasks of the plurality of tasks;

dynamically generating a temporary geofence for each task located at coordinates around a respective non-prearranged physical location for that task and existing during a respective timeframe for that task, wherein the dynamically generated geofences are linked with worker users that have signed up for that task;

temporarily tracking locations, via respective onboard location sensors, of mobile devices of worker users that are linked to a current temporary geofence during respective associated timeframes of those current temporary geofences; and operating a timeclock for each of the worker users in response to detection of their mobile device within a respective temporary geofence that they are linked to, wherein each timeclock indicates a length of time worked by that worker user on their respective task.

18. The method of claim 17, further comprising:

pausing the timeclock of each worker user having a mobile device detected as having left their respective temporary geofence during the existence of that temporary geofence until that mobile device is detected as having reentered that temporary geofence.

19. The method of claim 17, further comprising:

ending the timeclock for each worker user in response to an end of the respective associated timeframe for their task; and transmitting a payment to each associate user based on an amount of time recorded by their respective timeclock.

20. The method of claim 17, further comprising:

transmitting, by the temporary staffing application, a notification to each mobile device of worker users indicating an estimated arrival time to their respective temporary geofences based on departure at a stated time, wherein departure is based on either of:

a current location of their mobile device; or a registered address of that associate user.

* * * * *